Figure 1:
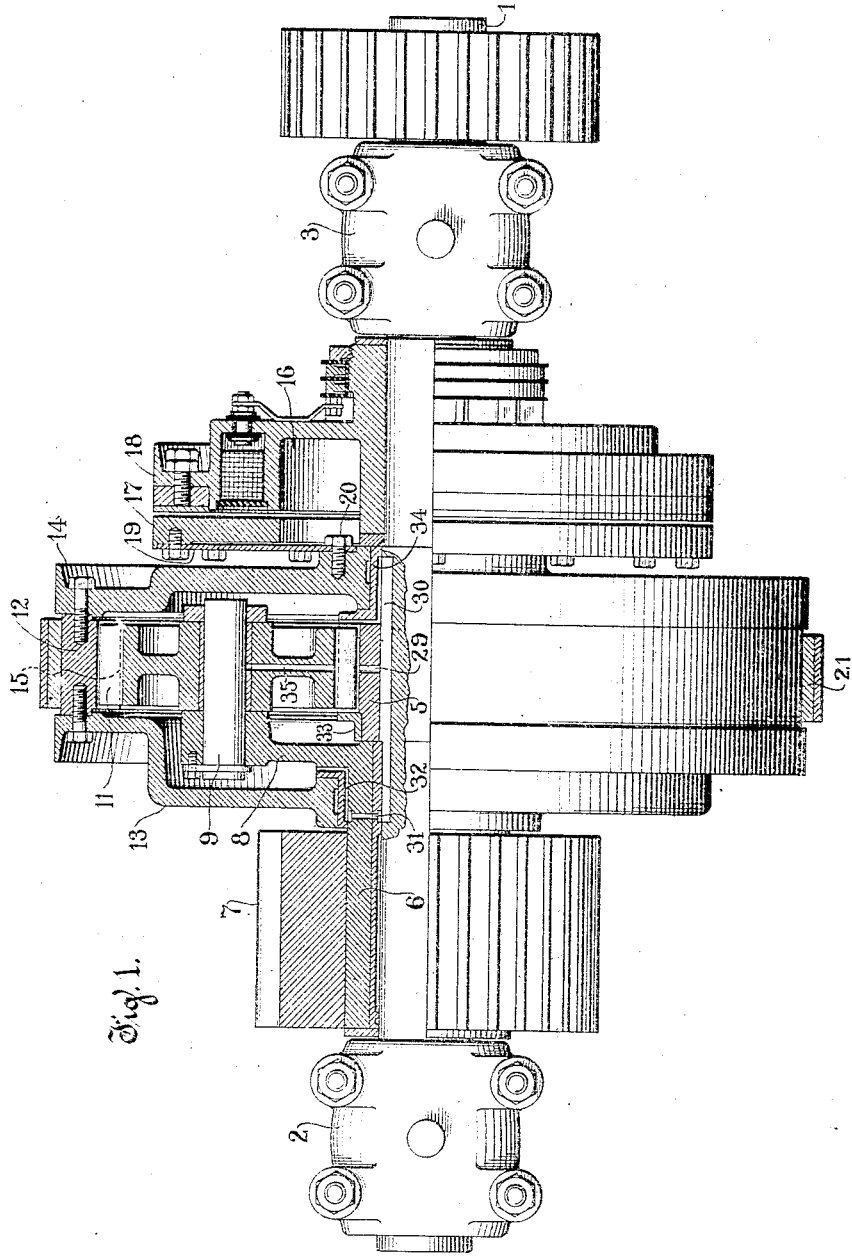

C. T. HENDERSON.
VARIABLE SPEED MECHANISM.
APPLICATION FILED OCT. 28, 1913.

1,122,924.

Patented Dec. 29, 1914.
2 SHEETS—SHEET 1.

Witnesses—
J. L. Johnson
J. H. Watson

Inventor
Clark T. Henderson
By Edwin P. Tower Jr.
Attorney

C. T. HENDERSON.
VARIABLE SPEED MECHANISM.
APPLICATION FILED OCT. 28, 1913.
1,122,924.
Patented Dec. 29, 1914
2 SHEETS—SHEET 2.
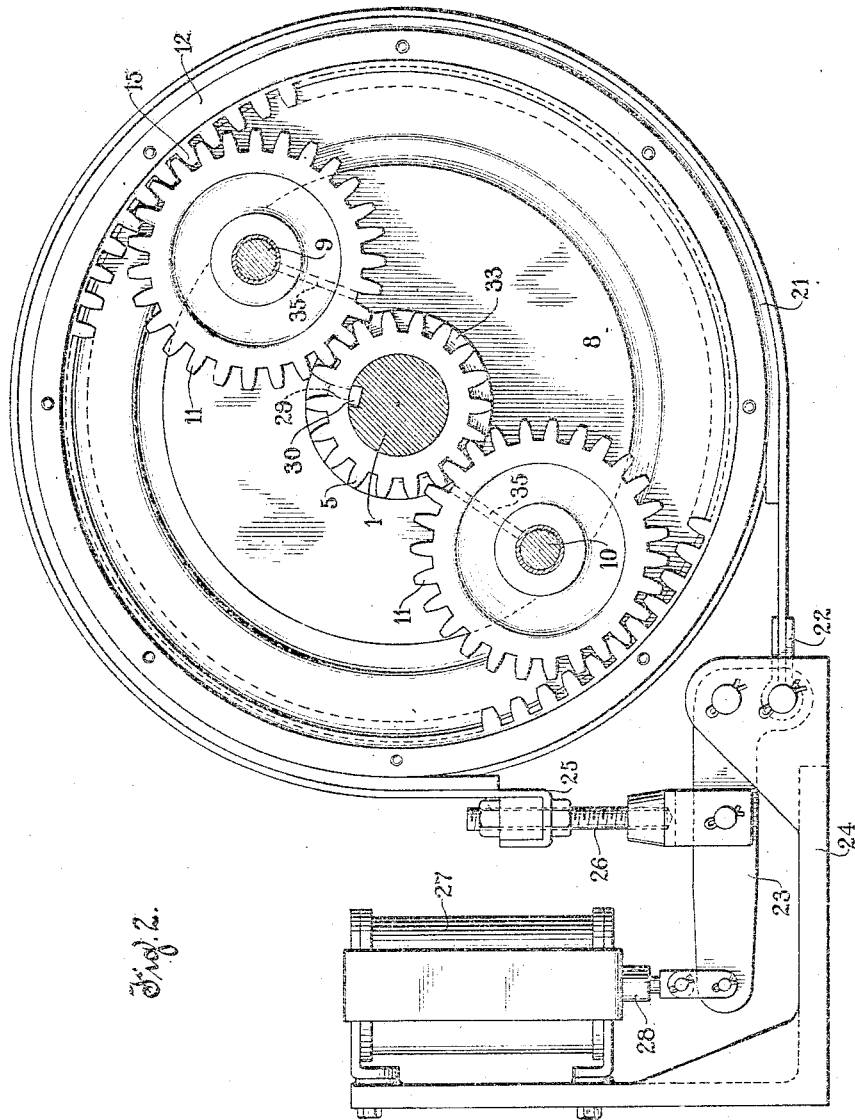

UNITED STATES PATENT OFFICE.

CLARK T. HENDERSON, OF MILWAUKEE, WISCONSIN.

VARIABLE-SPEED MECHANISM.

1,122,924.  Specification of Letters Patent.  Patented Dec. 29, 1914.

Application filed October 28, 1913. Serial No. 797,901.

*To all whom it may concern:*

Be it known that I, CLARK T. HENDERSON, a citizen of the United States, residing at Milwaukee, in the county of Milwaukee and State of Wisconsin, have invented new and useful Improvements in Variable-Speed Mechanisms, of which the following is a full, clear, concise, and exact description, reference being had to the accompanying drawing, forming a part of this specification.

This invention relates to variable speed mechanisms.

One of the objects of the invention is to provide an improved variable speed mechanism in which a gradual acceleration or reduction in speed is obtained when changing from low speed to high speed or vice versa.

Other objects will appear hereinafter.

In order to disclose my invention more clearly, I have illustrated one embodiment thereof in the accompanying drawing. It is to be understood, however, that other embodiments and modifications of the form illustrated may be made without departing from the spirit of the invention or the scope of the appended claims.

Figure 1 is a side view, partially in section, of a variable speed mechanism; and Fig. 2 is a sectional view through the reducing gears thereof.

In the drawings, a driving shaft 1 is journaled in bearings 2 and 3. The driving shaft is provided, preferably intermediate the bearings 2 and 3, with a fixed pinion 5. At one end of the pinion, for example at the left, as shown in Fig. 1, the driving shaft 1 is journaled through a hollow driven shaft 6, which is preferably supported between the bearing 2 and the pinion 5 on the driving shaft. The driven shaft 6 is provided at its outer end with a gear 7 through which power is transmitted to a driven mechanism, as, for example, a printing press. At the inner end of the driven shaft the same is provided with a spider 8 having diametrically opposed fixed shafts 9 and 10 thereon. Planet gears 11 are loosely mounted upon the shafts 9 and 10 and are concentrically mounted about the driving shaft so that the same are in constant mesh with the pinion 5. A casing or gear box 12 is loosely mounted on the driving and driven shafts and incloses the gears 11 and pinion 5. This casing preferably includes a side member 13 journaled on the driven shaft and a side member 14 journaled on the driving shaft. The casing is also provided with a circumferential internal gear 15, the teeth of which are in constant mesh with the teeth of the loose gears 11 at points opposite to the teeth of the same in mesh with the pinion 5 on the driving shaft.

In order to fix the casing 12 to the driving shaft I preferably employ a magnetic clutch 16. It is to be understood, however, that other forms of clutch devices may be used without sacrificing certain of the advantageous features of my improved device. As illustrated, the magnetic clutch comprises an annular armature member 17 and a magnet member 18. The armature member is secured to a resilient disk 19, which latter is secured by bolts 20 to the side member 14 of the casing, while the magnet member 18 is mounted upon and keyed to the driving shaft 1. The clutch 16 is preferably arranged between the end member 14 of the casing and the shaft bearing 3.

A brake band 21 encircles the casing 12, preferably on the outer side of the internal gear 15. One end 22 of the brake band is pivotally secured to the short arm of a bell-crank lever 23, which latter is mounted on a supporting frame 24 at one side of the casing 12 and in the plane thereof. The other end 25 of the brake band is adjustably connected by means of a turn buckle 26 to the long arm of the bell-crank lever 23.

Referring to Fig. 2, it will be evident that when the casing 12 rotates in a direction anti-clockwise the brake band 21 is automatically wrapped about the casing and tightened to hold the latter stationary. Conversely, when the casing rotates clockwise the end 25 of the brake band is loosened more rapidly than the end 22 is tightened so that the brake is automatically released and the casing freed to rotate. In practice, however, I prefer to provide additional means to positively release the brake band. In my preferred embodiment this means is electro-responsive and comprises a solenoid 27 mounted upon the supporting member 24. The solenoid core 28 is pivotally connected to the extremity of the long arm of the bell-crank lever. When the solenoid is energized, therefore, the end 25 of the brake band is raised to release the casing so that the same is free to rotate. The solenoid 27 is preferably arranged to be energized simultaneously with the magnetic clutch so that when the casing 12 is fixed to the driving shaft it is also instantaneously released from the brake band 21.

The driving shaft 1, as illustrated in Fig. 2, is driven in a clockwise direction by an electric motor, or other suitable power device. When the magnetic clutch 16 is deënergized, the geared casing 12, in mesh with the gears 11, tends to rotate anti-clockwise and thus automatically wraps up the brake band until the casing is held stationary. The gears 11 thereupon bodily rotate about the driving shaft 1 and carry the driven shaft 6 at any desired reduced speed ratio, for example, 4 to 1. To drive the driven shaft 6 at high speed the magnetic clutch 16 is energized, whereupon the armature member 17 turns with the magnet member 18 and the casing 12 rotates with the driving shaft 1 in a clockwise direction. As above described, the solenoid 27 is also energized with the clutch 16, so that the brake band 21 is immediately released from the casing. As the casing 12 rotates with the driving shaft 1 the gears 11 of the driven shaft bodily rotate with increased speed and carry the driven shaft and pinion 7 at a speed of 1 to 1 with the driving shaft. If it is desired to stop the driven shaft without stopping the motor, the clutch 16 may be deënergized and the solenoid 27 independently energized. The brake band 21 is thus released from the casing so that the latter is free to rotate anti-clockwise and spins idly about the driving shaft. The gears 11 thereupon also spin idly on their shafts 9 and 10 and the driven shaft remains at rest.

The pinion 5 is preferably provided with a radial aperture 29 extending to a longitudinal channel 30 in the driving shaft. At one end of the channel 30 the driven shaft is also provided with radial aperture 31 extending therethrough and leading to a channel 32 beneath the bearing of the side member 13 of the casing 12. The other end of the channel 30 leads to the bearing of the side member 14 of the casing. The casing 12 is oil tight so that the same may be partially filled with lubricant in which the gears 11 and the pinion 5 run. The pinion 5 is provided at one or both sides of its teeth with circumferential shrouds 33 and 34 which hold a portion of the oil so that the meshing teeth of the gears 11 and the pinion operate as a pump at each revolution during low speed to force the oil through the aperture 29 in the pinion 5 and along the channel 30 in the driving shaft to lubricate the bearings of the casing. The gears 11 are also provided with radial apertures 35 leading to the bearing shafts 9 and 10. Oil is thus pumped to the bearings of the gears 9 and 10 in a manner similar to that above described. A positive intermittent oil circulation is thus established which requires no attention and which operates effectively to lubricate all the reducing gear bearings during slow speed.

By my improved construction I am able to economize the space required by the change speed mechanism without sacrificing durability or strength of the parts. Furthermore, as the gears remain constantly in mesh and the casing is frictionally braked, the driven shaft may be changed from low speed to high speed without sudden acceleration and without injurious shocks or strain to the driven mechanism or to the parts of the variable speed device. It is also to be noted that all the reducing gears are inclosed in a dust-proof casing so that the same are not likely to get out of order or be subjected to undue wear. The brake band 21 operates automatically both when the driven shaft is operated at high speed and when the same is operated at low speed. By making the brake band adjustable in length the same may be compensated for the frictional wear in use and also to control the quickness with which the same is caught by the casing 12 during change of speed.

What I claim as new and desire to secure by Letters Patent is:

1. In combination, a driving member, a driven member, variable speed gearing interposed between the same, means normally locking a member of said gearing to effect one speed ratio of said driving and driven members, and means for establishing a positive drive for said normally locked member from said driving member to vary the speed ratio, said locking means automatically releasing said locked member when so driven.

2. In combination, a driving member, a driven member, variable speed gearing connecting the same including a normally loose gear, means for locking said gear to said driving member for high speed, said gear when released from said driving member tending to operate in an opposite direction thereto, and means for automatically locking said gear upon operation in said latter direction to establish a slow speed and for automatically releasing the same upon reversal of operation.

3. In combination, a driving member, a driven member, variable speed gearing interposed between the same including a gear normally tending to operate in a reverse direction to said driven member, locking means for said gear rendered effective by movement of said gear in such direction and rendered ineffective by reversal of movement, and means for locking said gear to said driving member to effect its reversal.

4. In combination, a driving member, a driven member, a pinion on said driving member, a loose gear, one or more pinions interposed between said loose gear and said driving pinion and operatively connected to said driven member and means for locking said loose gear for one speed and for connecting the same to said driving member for a higher speed, said loose gear being automatically released when driven by said driving member.

5. In combination, a driving member, a driven member, two concentric gears, one loose and one connected to said driving member, one or more connecting pinions between the same and operatively connected to said driven member, means for connecting said loose gear to said driving member for operation thereof in one direction and releasing the same for operation in a reverse direction through said connecting pinions, and means tending to lock said gear against operation in said latter direction and being ineffective upon a reversal of its operation.

6. In combination, a driving shaft, a driven shaft, variable speed mechanism interposed between said shafts including a loose member, means to automatically brake said member for establishing one speed, and means to fix said member to one of said shafts for establishing a second speed.

7. In combination, a driving shaft, a driven shaft, variable speed mechanism interposed between said shafts including a loose member, means to automatically brake said member for establishing one speed, means to fix said member to one of said shafts for establishing a second speed, and means operated simultaneously with said second-mentioned means for rendering said first-mentioned means inoperative.

8. In a variable speed mechanism, a driving shaft, a pinion fixed thereon, a driven shaft mounted concentrically with said driving shaft, offset loose gears thereon meshing with said pinion, a loose casing on one of said shafts having an internal gear meshing with said gears on said driven shaft, means to automatically hold said casing against rotation in one direction, and means to render said last-mentioned means inoperative.

9. In a variable speed mechanism, a driving shaft, a pinion fixed thereon, a driven shaft concentrically mounted with said driving shaft, a plurality of offset loose gears thereon concentric with and meshing with said pinion, a casing loose on said driving shaft and having an internal gear meshing with said gears on said driven shaft, electromagnetic means to fix said casing to said driving shaft, and means to automatically hold said casing against rotation when said electromagnetic means is deënergized.

10. In a variable speed mechanism, in combination, a driving shaft, a pinion fixed thereon, a driven shaft concentrically mounted with said driving shaft, a plurality of offset loose gears thereon concentric with and meshing with said pinion, a casing loose on said driving shaft and having an internal gear meshing with said gears on said driven shaft, electromagnetic means to fix said casing to said driving shaft, means to automatically hold said casing against rotation when said electromagnetic means is deënergized, and electro-responsive means to render said last mentioned means inoperative when said electromagnetic means is energized.

11. In a variable speed mechanism, in combination, a driving shaft, a pinion fixed thereto, a driven shaft concentrically mounted with said driving shaft, an offset loose gear thereon meshing with said pinion, a casing loose on said driving shaft and having an internal gear meshing with said gear on said driven shaft, and a brake band about said casing arranged to automatically hold said casing against rotation in one direction.

12. In a variable speed mechanism, in combination, a driving shaft, a pinion fixed thereto, a driven shaft concentrically mounted with said driving shaft, an offset loose gear thereon meshing with said pinion, a casing loose on said driving shaft and having an internal gear meshing with said gear on said driven shaft, a bell-crank lever, and a brake-band about said casing having one end secured to the short arm of said bell-crank lever and the other end secured to the long arm of said lever whereby said band automatically engages said casing when moved in one direction and is automatically released from said casing when moved in the other direction.

13. In a variable speed mechanism, in combination, a driving shaft, a pinion fixed thereon, a hollow driven shaft loose on said driving shaft, a plurality of offset loose gears thereon concentrically mounted about and meshing with said pinion on said driving shaft, a casing loose on said driving shaft and having an internal gear meshing with said gears on said driven shaft, means to automatically hold said casing against rotation in a direction opposite the direction of rotation of said driving shaft, means to render said last-mentioned means inoperative, and a magnetic clutch to fix said casing to said driving shaft.

14. In a variable speed mechanism, in combination, a driving shaft spaced bearings therefor, a fixed pinion thereon intermediate said bearings, a hollow driven shaft loose on said driving shaft intermediate one of said bearings and said pinion, a plurality of offset loose gears thereon concentrically mounted about and meshing with said pinion, a casing loose on said driven shaft and said driving shaft and inclosing said gears and said pinion, said casing having an internal gear meshing with said gears on said driven shaft, and electromagnetic means on said driving shaft and said casing intermediate said pinion and the other of said bearings to fix said casing to said driving shaft.

15. In a gear mechanism, a driving shaft, a pinion thereon, a driven shaft, a gear thereon meshing with said pinion, and a casing loose on said shafts, said pinion having an aperture and said driving shaft having a channel extending from said aperture to the bearings of said casing whereby a lubricant may be fed from said pinion to the bearings of said casing at each relative revolution of said driving and driven shafts.

16. In a gear mechanism, a driving shaft, a pinion thereon, a driven shaft, a gear thereon meshing with said pinion, and an oil receptacle inclosing said pinion and said gear and loose on said driving shaft, said pinion having an aperture therethrough and said driving shaft having a channel extending from said aperture to the bearings of said receptacle whereby oil may be pumped from said receptacle to the bearings thereof at each relative revolution of said driving and driven shafts.

17. In a gear mechanism, a driving shaft, a pinion, a driven shaft, a loose gear thereon meshing with said pinion, and a casing loose on said shafts, said pinion having a radial aperture and said driving shaft having a recess extending from said aperture to the bearings of said casing, and said gear having a radial aperture, whereby a lubricant may be automatically pumped through said pinion and gear to the bearings of said casing and said gear respectively at each relative revolution of said driving and driven shafts.

In witness whereof, I have hereunto subscribed my name in the presence of two witnesses.

CLARK T. HENDERSON.

Witnesses:
S. F. WATSON,
F. H. HUBBARD.